US008495330B2

(12) United States Patent
Vergis et al.

(10) Patent No.: US 8,495,330 B2
(45) Date of Patent: Jul. 23, 2013

(54) METHOD AND APPARATUS FOR INTERFACING WITH HETEROGENEOUS DUAL IN-LINE MEMORY MODULES

(75) Inventors: George Vergis, Hillsboro, OR (US); Kuljit Bains, Olympia, WA (US); Joe Salmon, Placerville, CA (US)

(73) Assignee: Intel Corporation, Santa Clara, CA (US)

( * ) Notice: Subject to any disclaimer, the term of this patent is extended or adjusted under 35 U.S.C. 154(b) by 599 days.

(21) Appl. No.: 12/753,355

(22) Filed: Apr. 2, 2010

(65) Prior Publication Data

US 2011/0246712 A1 Oct. 6, 2011

(51) Int. Cl.
*G06F 13/00* (2006.01)

(52) U.S. Cl.
USPC .................. 711/170; 711/105; 711/E12.084

(58) Field of Classification Search
None
See application file for complete search history.

(56) References Cited

U.S. PATENT DOCUMENTS

| 6,298,426 | B1 | 10/2001 | Ajanovic |
| 6,347,367 | B1 | 2/2002 | Dell et al. |
| 6,681,301 | B1 | 1/2004 | Mehta et al. |
| 7,307,900 | B2 | 12/2007 | Salmon et al. |
| 2002/0133684 | A1 | 9/2002 | Anderson |
| 2003/0223303 | A1* | 12/2003 | Lamb et al. ............... 365/230.06 |
| 2004/0143773 | A1* | 7/2004 | Chen .............................. 713/400 |
| 2006/0114742 | A1* | 6/2006 | Salmon et al. ................. 365/233 |
| 2007/0178864 | A1* | 8/2007 | Kiehl et al. ................. 455/186.1 |
| 2008/0082750 | A1 | 4/2008 | Okin et al. |

FOREIGN PATENT DOCUMENTS

DE 112006001738 5/2008

OTHER PUBLICATIONS

Search and Examination Report mailed Jul. 28, 2011 for Great Britain Patent Application No. GB1105538.
Non-Final Office Action mailed Jan. 17, 2012 for German Patent Application No. 10 2011 015 820.0.
Notice of Preliminary Rejections mailed Sep. 24, 2012 for Korean Patent Application No. 2011-0030418.
Search and Examination Report mailed Nov. 14, 2012 for GB Patent Application No. GB1105538.

* cited by examiner

*Primary Examiner* — Edward Dudek, Jr.
*Assistant Examiner* — Sean D Rossiter
(74) *Attorney, Agent, or Firm* — Blakely, Sokoloff, Taylor & Zafman LLP (57) ABSTRACT

Described herein is a method and apparatus to interface a processor with a heterogeneous dual in-line memory module (DIMM). The method comprises determining an identity of a DIMM having data lanes; mapping the data lanes based on the determining of the identity of the DIMM; training input-output (I/O) transceivers in response to the mapping of the data lanes; and transferring data to and from the DIMM after training the I/O transceivers.

24 Claims, 10 Drawing Sheets

| | 343 | 344 | 341 Front | | 342 Back | | | | 343 | 344 | 341 Front | | 342 Back | | |
|---|---|---|---|---|---|---|---|---|---|---|---|---|---|---|---|
| | | | ECC | DM | ECC | DM | | | | | ECC | DM | ECC | DM | |
| | 1 | DQ4 | DQ4 | DQ0 | DQ0 | 2 | | 123 | A5 | A5 | A3 | A3 | 124 |
| | 3 | VSS | VSS | VSS | VSS | 4 | | 125 | VDD | VDD | VDD | VDD | 126 |
| | 5 | DQ5 | DQ5 | DQ1 | DQ1 | 6 | | 127 | A2 | A2 | BG1 | BG1 | 128 |
| | 7 | VSS | VSS | VSS | VSS | 8 | | 129 | A1 | A1 | RFU | RFU | 130 |
| | 9 | DQ6 | DM0 | DQS0# | DQS0# | 10 | | 131 | VDD | VDD | VDD | VDD | 132 |
| | 11 | VSS | VSS | DQS0 | DQS0 | 12 | | 133 | CK1 | CK1 | CK0 | CK0 | 134 |
| | 13 | DQ7 | DQ6 | VSS | VSS | 14 | | 135 | CK1# | CK1# | CK0# | CK0# | 136 |
| | 15 | VSS | VSS | DQ2 | DQ2 | 16 | | 137 | VDD | VDD | VDD | VDD | 138 |
| | 17 | DQ12 | DQ7 | VSS | VSS | 18 | | 139 | BA1 | BA1 | A0 | A0 | 140 |
| | 19 | VSS | VSS | DQ3 | DQ3 | 20 | | 141 | BA0 | BA0 | A10_AP | A10_AP | 142 |
| | 21 | DQ13 | DQ12 | VSS | VSS | 22 | | 143 | VDD | VDD | VDD | VDD | 144 |
| | 23 | VSS | VSS | DQ8 | DQ8 | 24 | | 145 | RAS# | RAS# | WE# | WE# | 146 |
| | 25 | DQS1 | DQS1 | VSS | VSS | 26 | | 147 | CAS# | CAS# | S0# | S0# | 148 |
| | 27 | DQS1# | DQS1# | DQ9 | DM1 | 28 | | 149 | VDD | VDD | VDD | VDD | 150 |
| | 29 | VSS | VSS | VSS | VSS | 30 | | 151 | A16 | A16 | ODT0 | ODT0 | 152 |
| | 31 | DQ14 | DQ13 | DQ10 | DQ9 | 32 | | 153 | S1# | S1# | A13 | A13 | 154 |
| | 33 | VSS | VSS | VSS | VSS | 34 | | 155 | VDD | VDD | VDD | VDD | 156 |
| | 35 | DQ15 | DQ14 | DQ11 | DQ10 | 36 | | 157 | ODT1 | ODT1 | RFU | RFU | 158 |
| | 37 | VSS | VSS | VSS | VSS | 38 | | 159 | RFU | RFU | DQ36 | DQ38 | 160 |
| | 39 | DQ20 | DQ15 | DQ16 | DQ11 | 40 | | 161 | VSS | VSS | VSS | VSS | 162 |
| | 41 | VSS | VSS | VSS | VSS | 42 | | 163 | DQ32 | DQ34 | DQ37 | DQ39 | 164 |
| | 43 | DQ21 | DQ20 | DQ17 | DQ16 | 44 | | 165 | VSS | VSS | VSS | VSS | 166 |
| | 45 | VSS | VSS | VSS | VSS | 46 | | 167 | DQ33 | DM4 | DQS4 | DQS4 | 168 |
| | 47 | DQ22 | DM2 | DQS2 | DQS2 | 48 | | 169 | VSS | VSS | DQS4# | DQS4# | 170 |
| | 49 | VSS | VSS | DQS2# | DQS2# | 50 | | 171 | DQ34 | DQ35 | VSS | VSS | 172 |
| | 51 | DQ23 | DQ21 | VSS | VSS | 52 | | 173 | VSS | VSS | DQ38 | DQ44 | 174 |
| | 53 | VSS | VSS | DQ18 | DQ17 | 54 | | 175 | DQ35 | DQ40 | VSS | VSS | 176 |
| | 55 | DQ28 | DQ22 | VSS | VSS | 56 | | 177 | VSS | VSS | DQ39 | DQ45 | 178 |
| | 57 | VSS | VSS | DQ19 | DQ18 | 58 | | 179 | DQ36 | DQ41 | VSS | VSS | 180 |
| | 59 | DQ29 | DQ23 | VSS | VSS | 60 | | 181 | VSS | VSS | DQ44 | DQ46 | 182 |
| | 61 | VSS | VSS | DQ24 | DQ19 | 62 | | 183 | DQ41 | DQ42 | VSS | VSS | 184 |
| | 63 | DQS3 | DQS3 | VSS | VSS | 64 | | 185 | VSS | VSS | DQ45 | DQ47 | 186 |
| | 65 | DQS3# | DQS3# | DQ25 | DM3 | 66 | | 187 | DQS5 | DQS5 | VSS | VSS | 188 |
| | 67 | VSS | VSS | VSS | VSS | 68 | | 189 | DQS5# | DQS5# | DQ46 | DM5 | 190 |
| | 69 | DQ30 | DQ28 | DQ26 | DQ24 | 70 | | 191 | VSS | VSS | VSS | VSS | 192 |
| | 71 | VSS | VSS | VSS | VSS | 72 | | 193 | DQ42 | DQ43 | DQ47 | DQ52 | 194 |
| | 73 | DQ31 | DQ29 | DQ27 | DQ25 | 74 | | 195 | VSS | VSS | VSS | VSS | 196 |
| | 75 | VSS | VSS | VSS | VSS | 76 | | 197 | DQ43 | DQ48 | DQ52 | DQ53 | 198 |
| | 77 | CB4_NC | DQ30 | CB0_NC | DQ26 | 78 | | 199 | VSS | VSS | VSS | VSS | 200 |
| | 79 | VSS | VSS | VSS | VSS | 80 | | 201 | DQ48 | DQ49 | DQ53 | DQ54 | 202 |
| | 81 | CB5_NC | DQ31 | CB1_NC | DQ27 | 82 | | 203 | VSS | VSS | VSS | VSS | 204 |
| | 83 | VSS | VSS | VSS | VSS | 84 | | 205 | DQ49 | DM6 | DQS6 | DQS6 | 206 |
| | 85 | CB6_NC | DQ32 | DQS8 | NC | 86 | | 207 | VSS | VSS | DQS6# | DQS6# | 208 |
| | 87 | VSS | VSS | DQS8# | NC | 88 | | 209 | DQ50 | DQ50 | VSS | VSS | 210 |
| | 89 | CB7_NC | DQ33 | VSS | VSS | 90 | | 211 | VSS | VSS | DQ54 | DQ55 | 212 |
| | 91 | VSS | VSS | CB2_NC | DQ36 | 92 | | 213 | DQ51 | DQ51 | VSS | VSS | 214 |
| | 93 | CB3_NC | DQ37 | VSS | VSS | 94 | | 215 | VSS | VSS | DQ55 | DQ60 | 216 |
| | 95 | VSS | VSS | VSS | TEST | 96 | | 217 | DQ56 | DQ56 | VSS | VSS | 218 |
| | 97 | VREFCA | VREFCA | TEST | VPP | 98 | | 219 | VSS | VSS | DQ60 | DQ61 | 220 |
| | 99 | RESET# | RESET# | ERR_OUT# | ERR_OUT# | 100 | | 221 | DQ57 | DQ57 | VSS | VSS | 222 |
| | 101 | VDD | VDD | VDD | VDD | 102 | | 223 | VSS | VSS | DQ61 | DQ62 | 224 |
| | 103 | PAR | PAR | RFU | RFU | 104 | | 225 | DQ57 | DQ57 | VSS | VSS | 226 |
| | 105 | CKE0 | CKE0 | CKE1 | CKE1 | 106 | | 227 | DQS7 | DQS7 | DQ62 | DM7 | 228 |
| | 107 | VDD | VDD | VDD | VDD | 108 | | 229 | DQS7# | DQS7# | VSS | VSS | 230 |
| | 109 | A15 | A15 | BG0 | BG0 | 110 | | 231 | DQ58 | DQ58 | DQ63 | DQ63 | 232 |
| | 111 | A14 | A14 | A12 | A12 | 112 | | 233 | VSS | VSS | VSS | VSS | 234 |
| | 113 | VDD | VDD | VDD | VDD | 114 | | 235 | DQ59 | DQ59 | EVENT# | EVENT# | 236 |
| | 115 | A11 | A11 | A7 | A7 | 116 | | 237 | VSS | VSS | VDDSPD | VDDSPD | 238 |
| | 117 | A9 | A9 | A6 | A6 | 118 | | 239 | SCL | SCL | SA1 | SA1 | 240 |
| | 119 | VDD | VDD | VDD | VDD | 120 | | 241 | SA0 | SA0 | SDA | SDA | 242 |
| | 121 | A8 | A8 | A4 | A4 | 122 | | 243 | VTT | VTT | VTT | VTT | 244 |

340

Connector pin mapping

| ECC->DM | | DM->ECC | |
|---|---|---|---|
| ECC | DM | DM | ECC |
| CB0 | DM0 | DQ6 | CB0 |
| CB1 | DM1 | DQ9 | CB1 |
| CB2 | DM2 | DQ22 | CB2 |
| CB3 | DM3 | DQ25 | CB3 |
| CB4 | DM4 | DQ33 | CB4 |
| CB5 | DM5 | DQ46 | CB5 |
| CB6 | DM6 | DQ49 | CB6 |
| CB7 | DM7 | DQ62 | CB7 |

METHOD AND APPARATUS FOR INTERFACING WITH HETEROGENEOUS DUAL IN-LINE MEMORY MODULES

FIELD OF THE INVENTION

Embodiments of the invention relate generally to the field of processors. More particularly, embodiments of the invention relate to a method and an apparatus for interfacing a processor with a heterogeneous dual in-line memory module (DIMM).

BACKGROUND

Memory modules associated with computing devices at a high level are used for processing two general categories of data—graphics and general data. Examples of processing graphics include displaying an image on a screen while examples of processing general data other than graphics include processing financial data, word document processing, etc. Memory modules associated with processing graphics include a data mask (DM) DIMM (DM-DIMM). DM-DIMMs are specifically designed to improve memory usage of the dynamic access random memory (DRAMs) within the DM-DIMMs. Such DM-DIMMs have a specific pin-out interface that can only interface with a memory controller which is particularly designed to interface with a DM-DIMM. One reason for a custom memory controller to only interface with a DM-DIMM is to provide fast read and write operations to the DRAMs of the DM-DIMM when processing graphics. The fast read and write operations to the DRAMs of the DM-DIMM is accomplished by having an individual DM bit signal associated with the data lanes (or bus) for each DRAM of the DM-DIMM. One purpose of the DM bit signal is to mask the associated data lanes to avoid unnecessary write operations to the DRAM associated with the DM bit signal.

For example, if a small or a visually negligible portion of an image is to be updated with new data while the rest of the image is to remain the same, then a final new image does not need to be computed and re-stored in the DM-DIMM. In such a case, the DM bit signal for the DRAM is asserted to stop any update to the image data in the DRAM. Such a data mask bit signal saves intensive read and write operations on the DRAM because the final image did not need to change for its small or a visually negligible update.

Conversely, memory modules used for reading and storing general data other than graphics cannot be masked out because of a small or visually insignificant change. For example, if only one digit changes in a spreadsheet of financial data, such a digit cannot be masked out because it happens to be a small percentage of the entire financial data in the spreadsheet. Masking the entire financial data because of a change in one digit may result in an incorrect financial analysis based on the masked financial data. Such memory modules may include error correction capability via error correction code (ECC). The ECC may be used to scrub any incorrect data in the DRAMs of the DIMM so that the data in the DIMM is always correct. Such memory modules are called ECC-DIMMs and have a specific pin-out interface to interface with particular memory controllers called ECC memory controllers.

As computer form/structure is becoming compact, separate memory controllers on a computer motherboard to interface with different/heterogeneous types of DIMMs result in larger motherboard size area. Examples of heterogeneous DIMMs include DM-DIMM, ECC-DIMM, etc. Furthermore, a user of a computer is not able to interface the memory controller of the computer with different/heterogeneous DIMMs because the memory controller has a specific pin-out interface and logic (hardware and/or software) to interface with only one kind of DIMM rather than heterogeneous DIMMs. Plugging a DM-DIMM with a controller designed for ECC-DIMM only or vice versa may result into catastrophic system failure from, for example, power/ground signal shorting caused by different pin interface for power/ground pins for DM-DIMM and ECC-DIMM.

BRIEF DESCRIPTION OF THE DRAWINGS

Embodiments of the invention will be understood more fully from the detailed description given below and from the accompanying drawings of various embodiments of the invention, which, however, should not be taken to limit the invention to the specific embodiments, but are for explanation and understanding only.

FIG. 3C is a connector pin-out mapping caused by the memory controller to interface with either a DM-DIMM or an ECC-DIMM, according to one embodiment of the invention.

DETAILED DESCRIPTION

Embodiments of the invention relate to a method and apparatus for interfacing a processor with heterogeneous dual in-line memory modules (DIMMs). For illustrating the invention, the embodiments of the invention discuss two types of DIMMs that are referred to as heterogeneous DIMMs. As mentioned in the background section, the first type of DIMM is a data mask (DM) DIMM (DM-DIMM) while the second type of DIMM is an error correction code (ECC) DIMM (ECC-DIMM). The embodiments of the invention are not limited to the two types of DIMMs. Other types of DIMMs can be used to interface with the processor without changing the principal of operation of the embodiments of the invention.

In the following description, numerous details are discussed to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Note that in the corresponding drawings of the embodiments signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction any may be implemented with any suitable type of signal scheme, e.g., differential pair, single-ended, etc.

Figure 1:
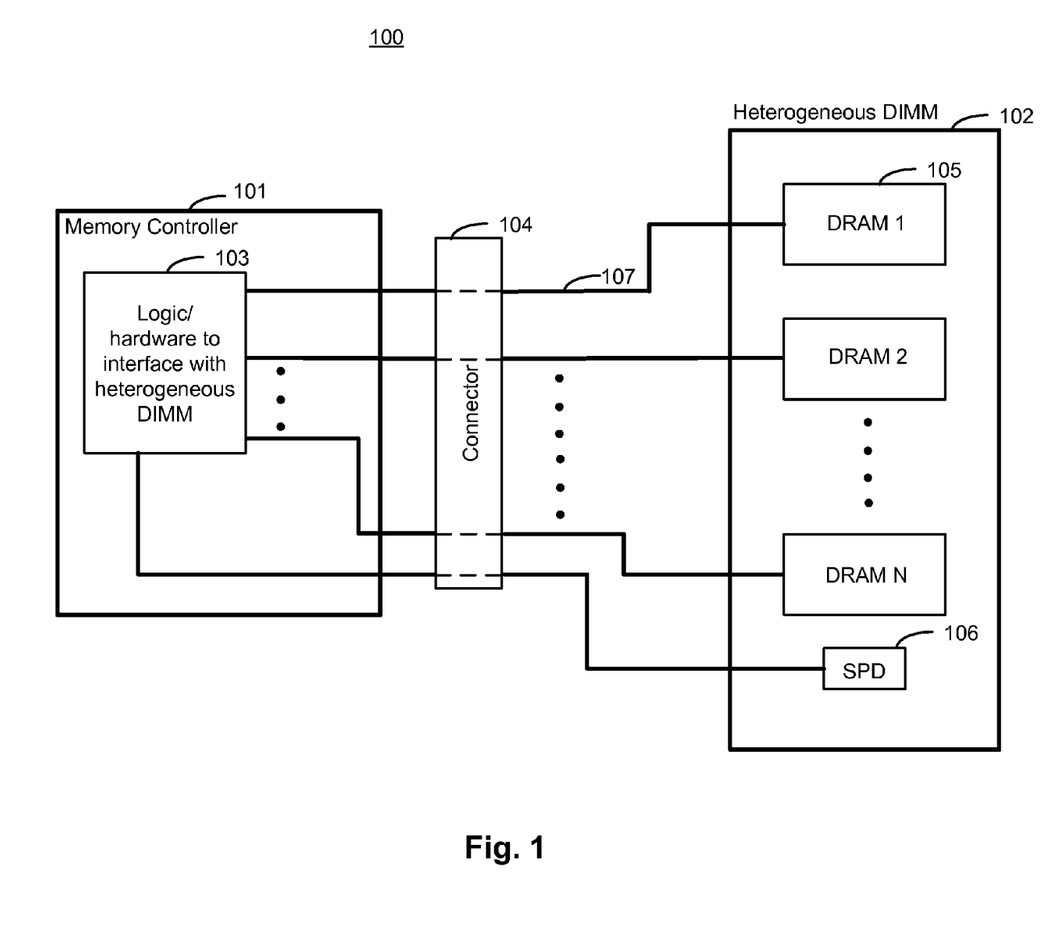
FIG. 1 illustrates a high level system architecture of a memory controller to interface with a heterogeneous dual in-line memory module (DIMM), according to one embodiment of the invention.

FIG. 1 illustrates a high level system architecture 100 of a memory controller 101 (also referred to as a processor or a device) to interface with a heterogeneous DIMM 102, according to one embodiment of the invention. In one embodiment, the memory controller 101 is operable to interface and communicate with the heterogeneous DIMM 102 via interconnects 107. In one embodiment, the memory controller 101 is operable to interface and communicate with the heterogeneous DIMM 102 after determining an identification of the heterogeneous DIMM 102 via a serial presence detect (SPD) identification 106.

In one embodiment, the SPD identification 106 contains an identification that signifies that the heterogeneous DIMM 102 is a DM-DIMM having one or more DRAM units 105. In another embodiment, the SPD identification 106 contains an identification that signifies that the heterogeneous DIMM 102 is an ECC-DIMM having one or more DRAM units 105 and an ECC DRAM unit (not shown) to scrub the DRAM units 105 for errors in the DRAM bits. In other embodiments, the SPD identification 106 contains an identification that signifies that the heterogeneous DIMM 102 is a DIMM other than a DM-DIMM and an ECC-DIMM.

In one embodiment, the memory controller 101 includes one or more logic units 103 (hardware and/or software) to interface with the heterogeneous DIMM 102 via a connector 104. In one embodiment, the connector 104 resides independently on the motherboard and is not integrated within the memory controller 101 shown in FIG. 1. In other embodiments, the connector 104 is functionally fully integrated within the memory controller 101.

In one embodiment, the one or more logic units 103 are operable to read the SPD identification 106 and then map (which is discussed later) the signals to interface with the heterogeneous DIMM 102 based on the SPD identification 106. In one embodiment, all signals to the heterogeneous DIMM 102 are mapped by the logic unit 103 according to the SPD identification 106. In other embodiments, only a subset of signals to the heterogeneous DIMM 102 is mapped by the logic unit 103 according to the SPD identification 106. In one embodiment, the memory controller 101 is incorporated within a central processing unit (CPU). In other embodiments, the memory controller 101 is an independent processor (also called micro-controller) separate from the CPU but communicatively coupled with the CPU.

Figure 2:
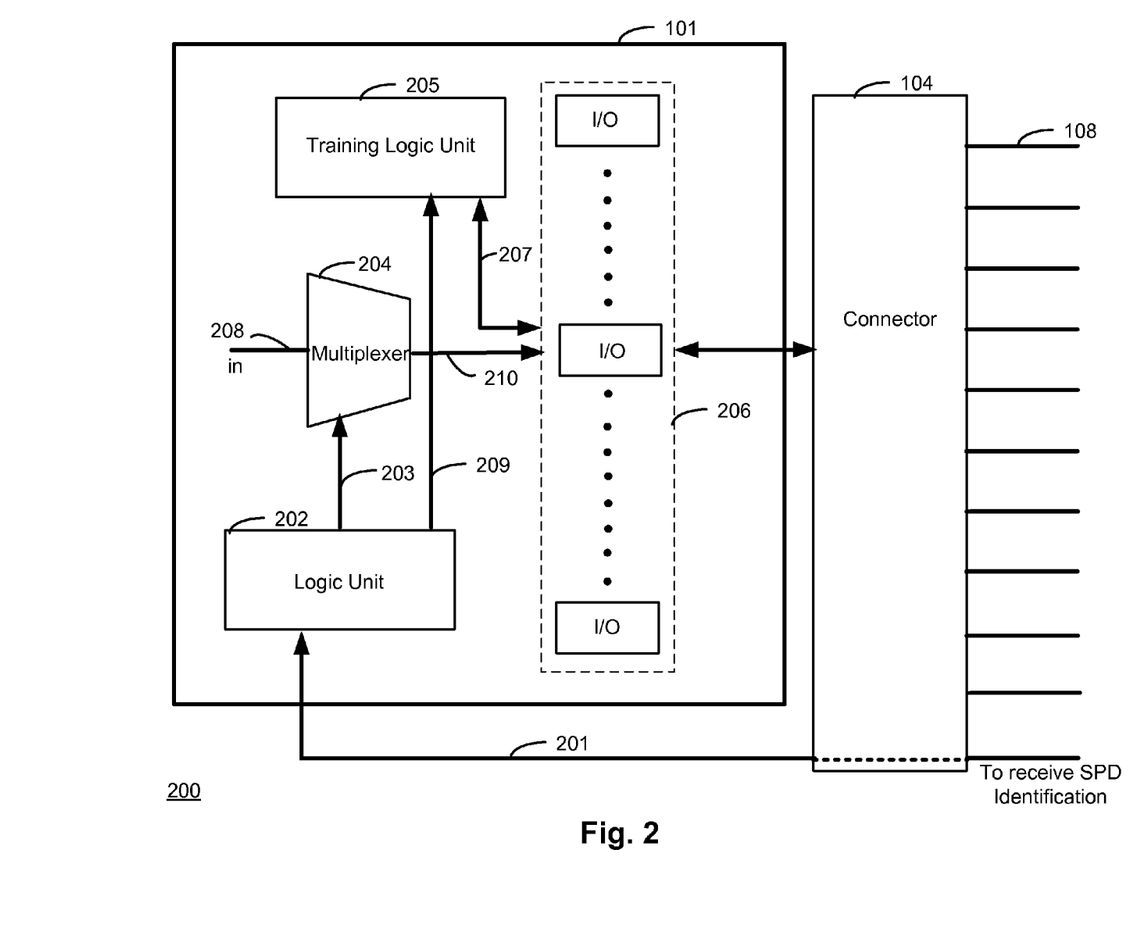
FIG. 2 is a memory controller operable to interface with the heterogeneous DIMM, according to one embodiment of the invention.

FIG. 2 illustrates is a detailed block diagram 200 showing components of the memory controller 101, according to one embodiment of the invention. In one embodiment, the memory controller 101 is operable to electrically couple with the heterogeneous DIMM (102 of FIG. 1) via connector pins 108 of a connector 104 and data lanes or buses (not shown). In one embodiment, the connector pins 108 are driven by input-output (I/O) transceivers 206 that send and receive data to and from the heterogeneous DIMM (102 of FIG. 1). In one embodiment, a training logic unit 205 is operable to train the I/O transceivers 206 based on the SPD identification 201 (same as 106 of FIG. 1) received by the logic unit 202 from the heterogeneous DIMM (102 of FIG. 1) via the connector 104. In one embodiment, the training logic unit 205 is operable to provide training signals 207 to the I/O transceivers 206 after the logic unit 202 informs the training logic unit 205 via signal path 209 that the heterogeneous DIMM 102 is indentified from its SPD identification 201.

In one embodiment, the logic unit 202 is operable to read the SPD identification 201 and to determine a select signal 203 for a multiplexer 204. In one embodiment, the multiplexer 204 comprises a plurality of multiplexers to output signal 210 (which is a plurality of signals) for the I/O transceivers 206. In one embodiment, the input signal 208 (which is a plurality of signals) is mapped to the I/O transceivers 206 in response to the select signal 203 of the multiplexer 204.

The term map refers to assigning or re-assigning an input signal from among the input signals 208 to a particular I/O transceiver from among the I/O transceivers 206 so that the connector pin 108 drives a signal which is expected by the heterogeneous DIMM (102 of FIG. 1). The expected signal refers to a signal which the heterogeneous DIMM comprehends. For example, an ECC-DIMM does not comprehend a DM bit signal because a DM bit signal is not used by the ECC-DIMM architecture and so an ECC-DIMM does not expect a DM bit signal to be received by the ECC-DIMM.

In one embodiment, after the input signals 208 are mapped to particular I/O transceivers from among the I/O transceivers 206, the training logic unit 205 begins a sequence of operations to adjust signal characteristics of the output signal to be sent to the heterogeneous DIMM (102 of FIG. 1). In one embodiment, the training logic unit 205 is operable to position a data strobe signal transmitted from the memory controller 101 to the heterogeneous DIMM (102 of FIG. 1) to be near or at the center of a corresponding data signal. FIG. 4C, which is discussed later, provides details of the training sequence executed by the training logic unit 205, according to one embodiment of the invention.

In one embodiment, the training logic unit 205 is operable to align a data strobe signal to a center of corresponding signals on the data lanes, wherein the data lanes are interconnect buses between the heterogeneous DIMM (102 of FIG. 1) and the connector pins 108. In one embodiment, the training logic unit 205 is operable to adjust an eye width and height of signals on the data lanes by adjusting the drive strength of the I/O transceivers 206. In one embodiment, the training logic unit 205 is operable to adjust the delays associated with signals on the data lanes so that signals on all data lanes have substantially equal flight times. In one embodiment, the training logic unit 205 is operable to adjust the termination impedance of the I/O transceivers 206. In one embodiment, the training logic unit 205 is operable to train the I/O transceivers 206 according to well known methods.

The following embodiments discuss two types of heterogeneous DIMMs—DM-DIMM and ECC-DIMM—so as not to obscure the embodiments of the invention. As mentioned above, other types of heterogeneous DIMMs may be used without changing the essence of the embodiments of the invention.

Figure 3A:
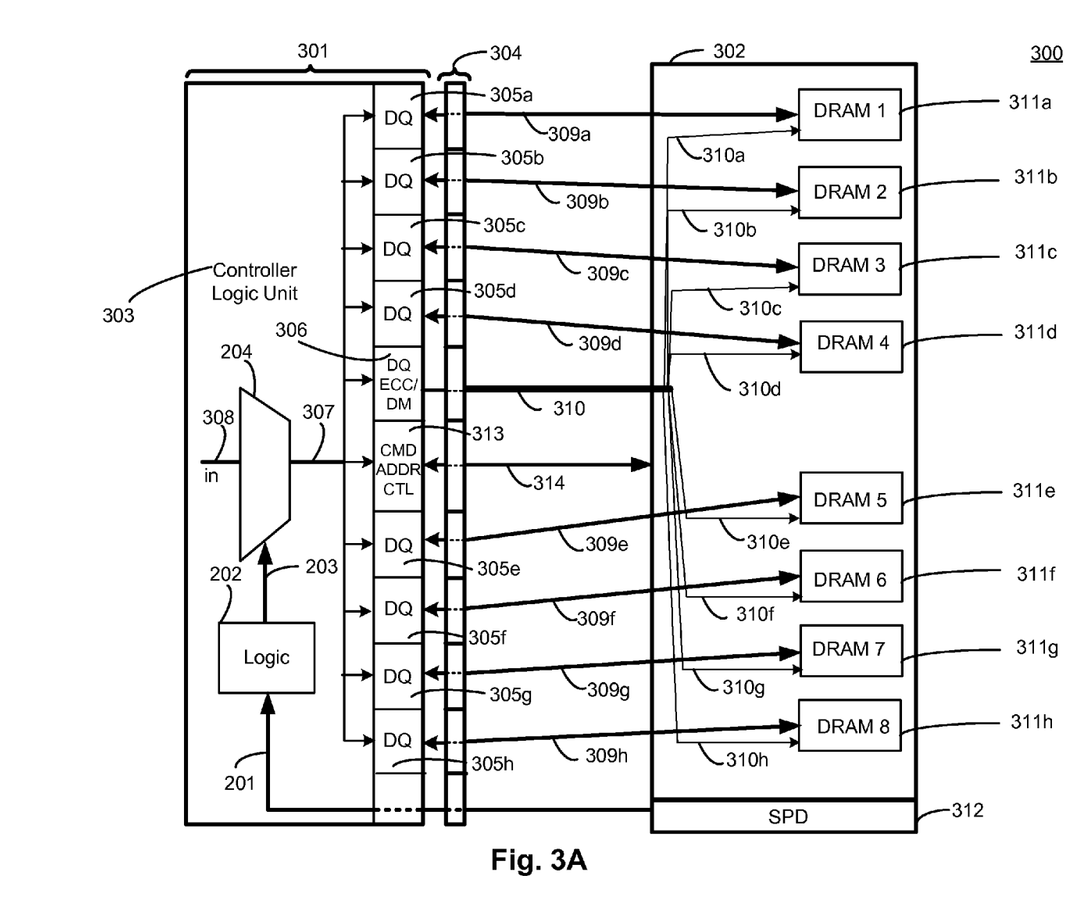
FIG. 3A illustrates the memory controller for interfacing with a data mask (DM) DIMM (DM-DIMM), according to one embodiment of the invention.

In one embodiment, the logic unit 202 is operable to identify that the SPD identification 201 of the heterogeneous DIMM (102 of FIG. 1) is a DM-DIMM. In such an embodiment, the logic unit 202 is operable to send a select signal 203 to the multiplexer 204 so that a DM bit signal is assigned to a bit lane reserved for a subset of the data lanes for an ECC DRAM unit (323 of FIG. 3B). As mentioned above, the term data lane refers to an interconnect bus between the heterogeneous DIMM (102 of FIG. 1) and the memory controller 101. FIG. 3A, which is discussed later, provides a functional view of how the data lanes are reassigned for a DM-DIMM compared to an ECC-DIMM, according to one embodiment of the invention.

Figure 3B:
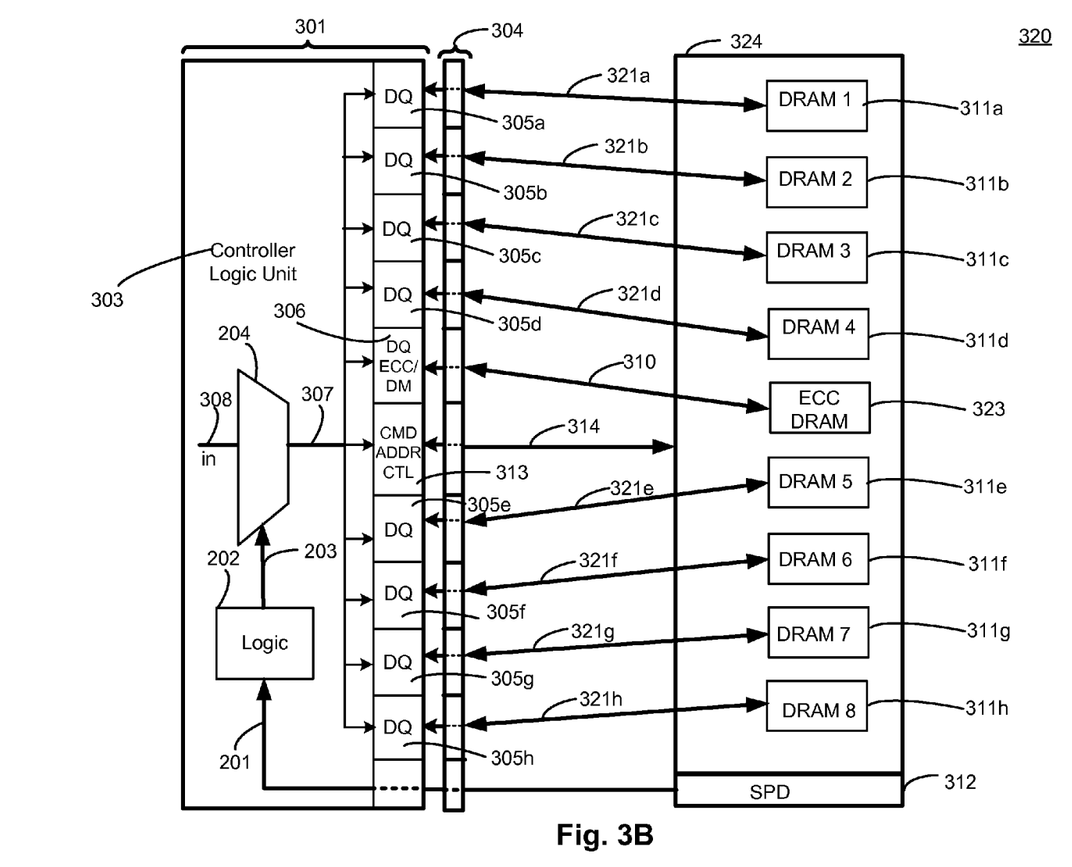
FIG. 3B illustrates the memory controller for interfacing with an error correction code (ECC) DIMM (ECC-DIMM), according to one embodiment of the invention.
Figure 3D:
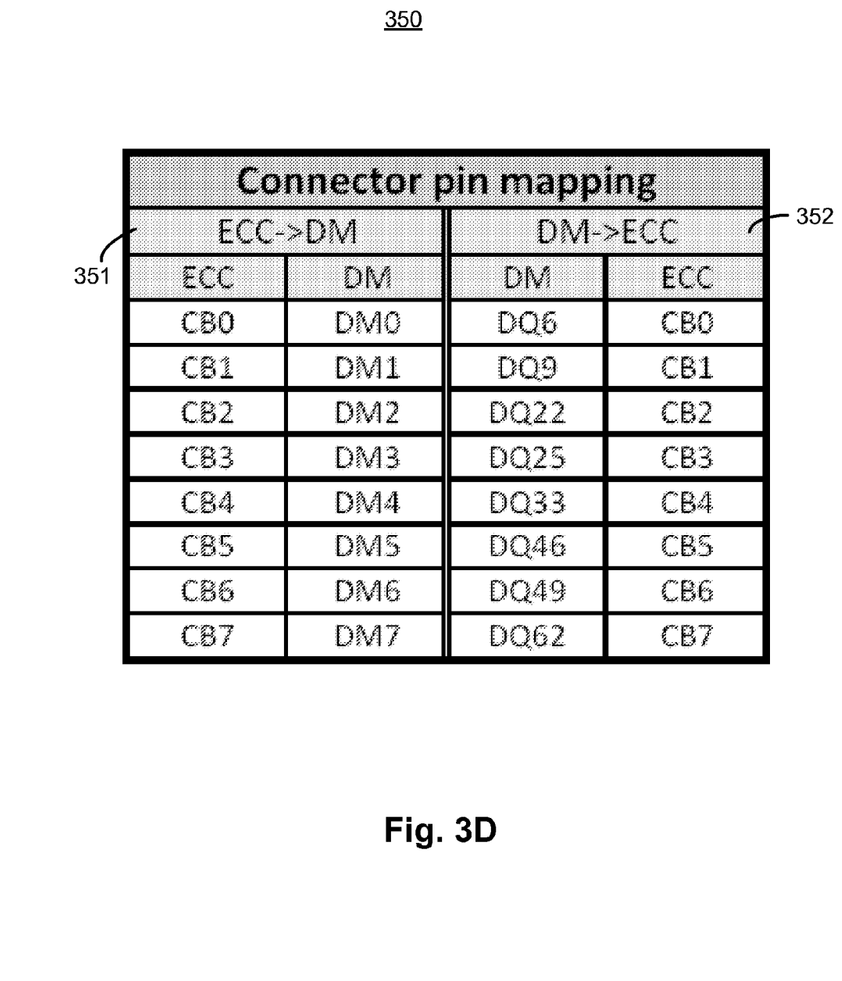
FIG. 3D is another connector pin-out mapping caused by the memory controller to interface with either a DM-DIMM or an ECC-DIMM, according to one embodiment of the invention.

In one embodiment, the logic unit 202 is operable to identify that the SPD identification 201 of the heterogeneous DIMM (102 of FIG. 1) is an ECC-DIMM. In such an embodiment, the logic unit 202 is operable to send a select signal 203 to the multiplexer 204 so that a subset of the data lanes from among the data lanes is assigned to an ECC DRAM unit (323 of FIG. 3B) of the ECC-DIMM (324 of FIG. 3B). FIG. 3B, which is discussed later, provides a functional view of how the data lanes are reassigned for an ECC-DIMM compared to a DM-DIMM, according to one embodiment of the invention. FIG. 3C and FIG. 3D, which are also discussed later, provide details of signal mapping between a DM-DIMM and an ECC-DIMM, according to one embodiment of the invention.

While the embodiments herein discuss the logic units that map/assign input signals 208 to output signals 210 for the I/O transceivers 206 based on the SPD identification 201 of the heterogeneous DIMM, a similar logic (not shown) is used to remap signals from the heterogeneous DIMM based on the SPD identification 201. In one embodiment, the above logic (not shown in figures) remaps signals coming from the heterogeneous DIMM via the connector 104 and the I/O transceivers 206 into the memory controller 101 for processing.

FIG. 3A illustrates a system level block architecture 300 with a memory controller 301 for interfacing with a DM-DIMM 302, according to one embodiment of the invention. In such an embodiment, the heterogeneous DIMM (102 of FIG. 1) is a DM-DIMM 302. In one embodiment, the DRAMs 311a-h of the DM-DIMM 302 are operable to receive data signals 309a-h and corresponding DM bit signals 310a-h, respectively. While the embodiment of FIG. 3A shows 8 DRAM units per DM-DIMM, fewer or more DRAM units may be used that can be mapped with the memory controller 301 via the same method and apparatus discussed herein.

In one embodiment, the controller logic unit 303 (103 of FIG. 1) of the memory controller 301 is operable to receive an SPD identification 312 from the DM-DIMM 302 via an interconnect 201. In one embodiment, the logic unit 202 of the controller logic unit 303 is operable to determine a select signal 203 to map each input signal from among the input signals 308 as output signals 307 to a particular I/O transceiver from among the I/O transceivers 305a-h, 306, and 313 of the memory controller 301. While the embodiment of FIG. 3A shows 10 sets of I/O transceivers (305a-h, 306, and 313), fewer or more sets of I/O transceivers may be used to interface with a heterogeneous DIMM. In one embodiment, each set of I/O transceivers (305a-h, 306, and 313) has one or more I/O transceivers.

In one embodiment, the connector interface 304 is a universal connector interface. In such an embodiment, the connector interface 304 remains the same, i.e., same number of pins at the same location with same physical form/structure to the external world, while the I/O transceivers 305a-h of the memory controller 301 are operable to send and receive different signals to and from the heterogeneous DIMM depending on the SPD identification 312 of the heterogeneous DIMM.

In one embodiment, the multiplexer 204 is operable to assign each output signal from among the output signals 307 to individual sets of I/O transceivers 305a-h so that each DRAM 311a-h receives a corresponding data bus 309a-h with a corresponding DM bit signal 310a-h (from the bus 310). In one embodiment, the assignment of the I/O transceivers 305a-h, 306, and 313 is done so that the I/O transceivers in the middle i.e., 306 is assigned to drive DM bit signals 309a-h to the heterogeneous DIMM if the heterogeneous DIMM is a DM-DIMM and to drive ECC signals (not shown) to a heterogeneous DIMM if the heterogeneous DIMM is an ECC-DIMM. By assigning the I/O transceivers 306 in the middle, fewer overall signals need to be reassigned between an ECC-DIMM and a DM-DIMM compared to re-assigning the entire signals when switching between an ECC-DIMM to a DM-DIMM.

In one embodiment, the I/O transceivers 313 which are reserved for address and control signals remain unchanged whether the heterogeneous DIMM is a DM-DIMM or an ECC-DIMM. In such an embodiment, the number of re-assigned signals from among the output signals 307 is reduced compared to re-assigning all output signals 307 caused by switching between a DM-DIMM to an ECC-DIMM or vice versa. In another embodiment, all the I/O transceivers 305a-h, 306, and 313 are reassigned different output signals 307 from the multiplexer 204 so that a proper communicative connection of the memory controller 301 with the heterogeneous DIMM (102 of FIG. 1) is established.

In one embodiment, once the output signals 307 are assigned/mapped to a particular I/O transceiver from among the I/O transceivers 305a-h, 306, and 313, the training logic unit 205 of FIG. 2 trains the I/O transceivers 305a-h, 306, and/or 313 to meet a particular or pre-determined signal-integrity constraint (e.g., overshoot, undershoot, Vol, Voh, eye width and height, etc.), power constraint (e.g., power consumption), and timing constraint (e.g., valid time, setup time, hold time, etc.) of the signals 309a-h, 310a-h, 314.

FIG. 3B illustrates a system architecture 320 showing how the signals on the data lanes are reassigned for an ECC-DIMM compared to a DM-DIMM of FIG. 3A, according to one embodiment of the invention. The term data lanes and signals on the data lanes are used interchangeably in the description. The process of mapping signals on data lanes generally refers to identifying and assigning specific signals to be driven on those data lanes. In one embodiment, the logic unit 202 is operable to determine that the heterogeneous DIMM (102 of FIG. 1) is an ECC-DIMM 324. In one embodiment, the ECC-DIMM 324 includes one or more DRAMs 311a-h and an ECC DRAM unit 323 to correct any error in data value in the DRAMs 311a-h. In one embodiment, the ECC-DIMM 324 receives no DM-bit signals for reasons discussed in the background section.

In one embodiment, after the logic unit 202 determines that the heterogeneous DIMM is an ECC-DIMM 324 by reading the SPD identification 312, the logic unit 202 generates a select signal 203. In one embodiment, the select signal 203 is operable to assign/map the input signals 308 as output signals 307 so that the memory controller 301 properly communicates with the ECC-DIMM 324.

In one embodiment, proper communication between the memory controller 301 and the ECC-DIMM 324 occurs by assigning/mapping the output signals 307 to individual sets of I/O transceivers 305a-h, 306, and 313 for communicating with the DRAMs 311a-h and an ECC DRAM unit 323. Compared to the embodiments of FIG. 3A, signals 310 from the I/O transceivers 306 of FIG. 3B are all assigned to the ECC DRAM unit 323 and not to the DRAMs 311a-h as DM bit signals. In such an embodiment, the DRAMs 311a-h are operable to receive the output signals 307 via signals 321a-h from I/O transceivers 305a-h, respectively. In this embodiment, the ECC signals 310 are generated by the I/O transceivers 306 which reside substantially in the middle of the column of I/O transceivers 305a-h, 306, and 313.

One reason for assigning/mapping signals from the output signals 307 for ECC purposes to I/O transceiver 306 is the location of the ECC DRAM unit 323 within the ECC-DIMM 324—the ECC DRAM unit 323 is substantially in the middle of the ECC-DIMM 324 and so the signals 310 for ECC purposes from among the output signals 307 are assigned/mapped to the I/O transceiver 306 which is also substantially in the middle of the memory controller 301. In such an embodiment, the ECC signals 310 have a shorter distance to travel from the I/O transceivers 306 to the ECC DRAM unit 323. The shorter distance allows for faster arrival time of ECC signals 310 and relatively easier signal timing adjustment by adding delays to the ECC signals 310 to meet the timing constraints.

While the embodiment of FIG. 3B shows 10 sets of I/O transceivers (305a-h, 306, and 313), fewer or more sets of I/O transceivers may be used to interface with a heterogeneous DIMM. Similarly, while the embodiment of FIG. 3B shows 8 DRAM units (311a-h) per ECC-DIMM 324, fewer or more DRAM units may be used that can be mapped with the memory controller 301 via the same method and apparatus discussed herein.

In one embodiment substantially all output signals 307 to the I/O transceivers 305a-h are reassigned according to the identification 201 of the heterogeneous DIMM (102 of FIG. 1).

In one embodiment, the timing logic unit 205 of FIG. 2 (not shown in FIGS. 3A-B) is operable to instruct the multiplexer 204 to reassign signals previously assigned to I/O transceivers 305e to I/O transceivers 305d to meet signal constraints such as timing constraints and signal integrity constraints.

FIG. 3C is a detailed Table 340 showing reassignment of the output signals 307 based on the SPD identification of the heterogeneous DIMM 102 of FIG. 1, according to one embodiment of the invention. Table 340 shows the functional pin-outs from the memory controller 301 of FIGS. 3A-B when an ECC-DIMM is replaced with a DM-DIMM or vice versa, according to one embodiment of the invention. In one embodiment, Table 340 is pin-out of a small-outline DIMM (SO DIMM) having 244 pins. The pins on the front and back of the DIMM are identified as pins in columns 341 and 342 respectively. Column 343 of the Table 340 illustrates the functional attributes of the pins if the heterogeneous DIMM is an ECC-DIMM while column 344 of the Table 340 illustrates a corresponding functional attribute of the pins if the ECC-DIMM is replaced with a DM-DIMM. In one embodiment, the functional attributes of the pins change between the ECC-DIMM and the DM-DIMM via the memory controller 101.

In one embodiment, interconnects for the re-mapped data bit signals (i.e., DQ and DQS signals) are matched within a distance of +/−25 mils on the motherboard. In one embodiment, the multiplexing by the multiplexer 204 is done so that there are 72 fully matched DQ signal bits with corresponding 9 associated DQS (strobe) signals. In one embodiment, when the DM-DIMM is replaced with an ECC-DIMM, the memory controller 101 regroups the DQ bits via the multiplexer 204 while skipping the DM bit signals as shown in FIG. 3D.

FIG. 3D illustrates a connector pin mapping by the memory controller 101 with respect to specific signals from Table 340 of FIG. 3C, according to one embodiment of the invention. The connector pin mapping is shown by Table 350. The left half 351 of the Table 350 illustrates the functional mapping/assignment of connector pins 108 caused by the memory controller 101 when swapping an ECC-DIMM with a DM-DIMM, according to one embodiment of the invention. In such an embodiment, the memory controller 101 is operable to re-assign the data lanes reserved for ECC signals (310 in FIG. 3A) to be used as data mask signals (310a-h in FIG. 3A). The right half 352 of the Table 350 illustrates the functional mapping/assignment of connector pins 108 caused by the memory controller 101 when swapping a DM-DIMM with an ECC-DIMM, according to one embodiment of the invention. In such an embodiment, the memory controller 101 is operable to re-assign specific data lanes previously used by the DM-DIMM to be used as ECC signals (310 in FIG. 3B). The embodiments of FIGS. 3C-D are not limiting embodiments. Other embodiments that map/re-assign data lanes different from the ones shown in Tables 340 and 350 can be used without changing the essence of the embodiments of the invention.

Figure 4A:
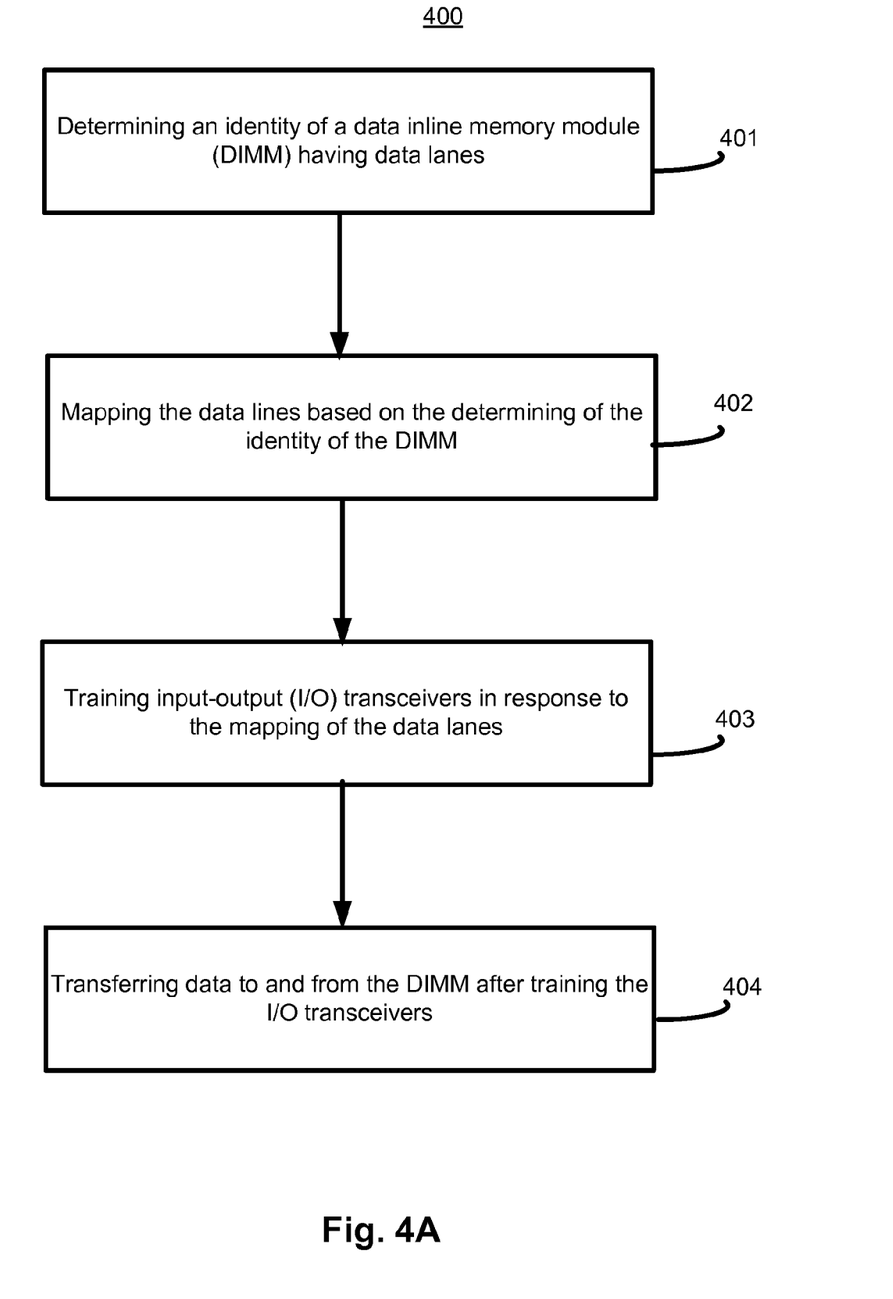
FIG. 4A illustrates a high level flow chart for interfacing the memory controller with a heterogeneous DIMM, according to another embodiment of the invention.
Figure 4B:
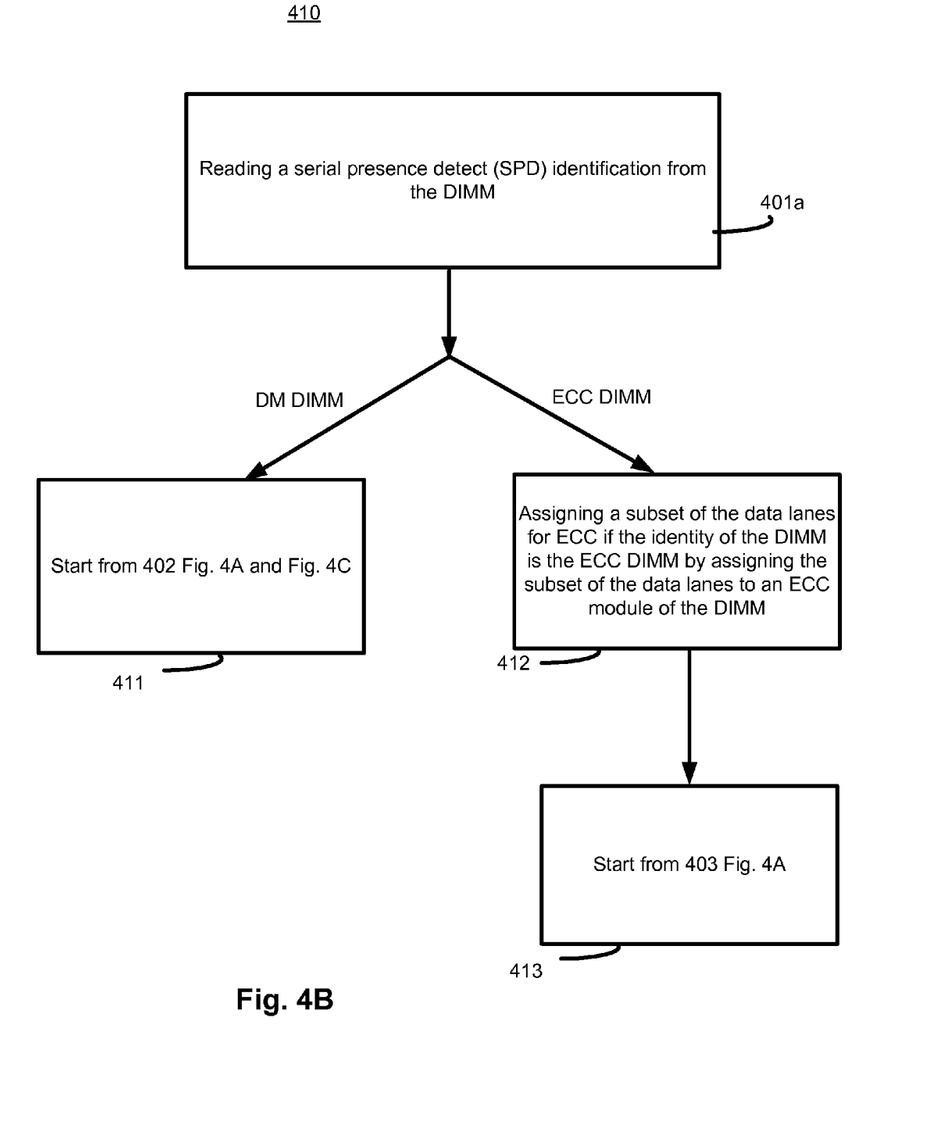
FIG. 4B illustrates a flow chart for determining an identification of a heterogeneous DIMM for interfacing the memory controller with the heterogeneous DIMM, according to one embodiment of the invention.
Figure 4C:
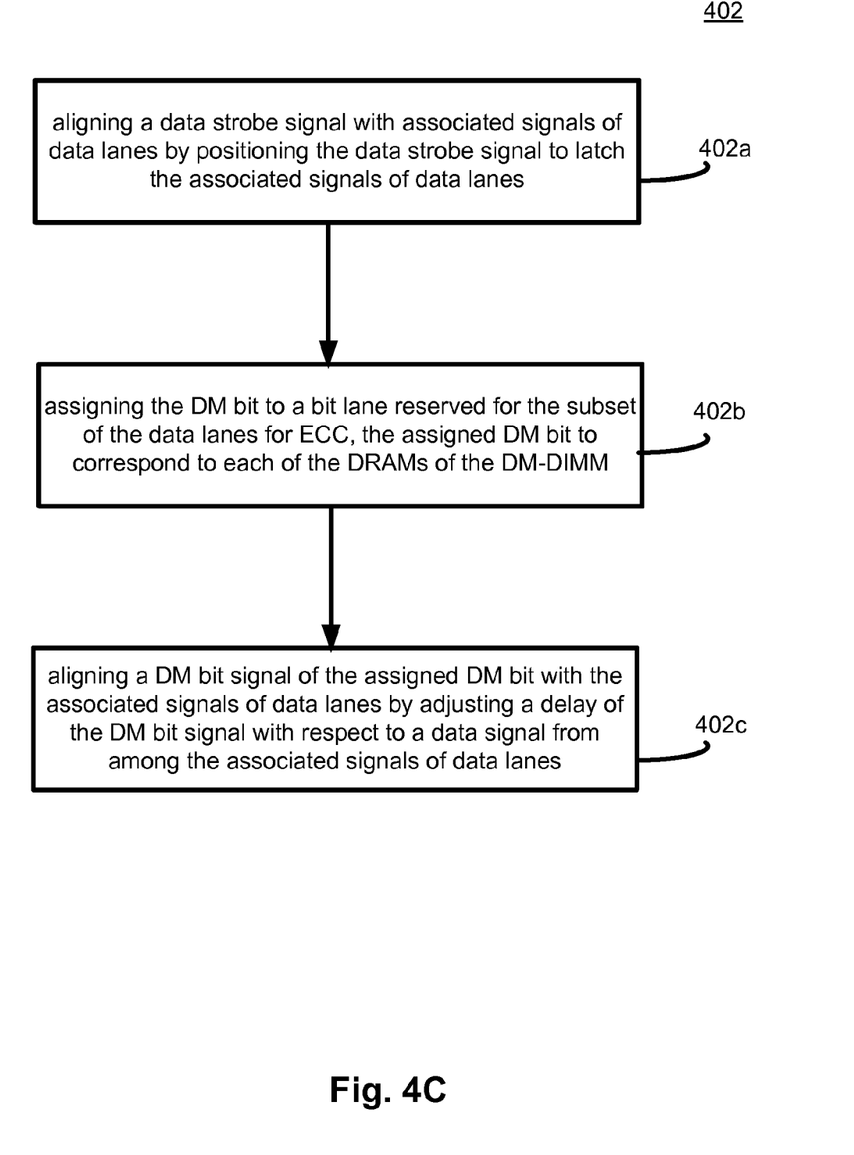
FIG. 4C illustrates a flow chart for mapping signals to the input-output (I/O) transceivers of the memory controller to interface with a heterogeneous DIMM, according to one embodiment of the invention.

FIGS. 4A-C illustrate a flow chart for interfacing the memory controller 101 of FIGS. 1-2 with a heterogeneous DIMM 102 of FIG. 1, according to another embodiment of the invention. The flow charts are described with reference to the embodiments of FIG. 1-3.

FIG. 4A illustrates a high level flow chart 400 for interfacing the memory controller 101 of FIG. 1-2 with a heterogeneous DIMM 102 of FIG. 1, according to another embodiment of the invention. At block 401, the memory controller 101 determines the identity of the heterogeneous DIMM via the SPD identification 201. At block 402, the logic unit 202 maps the input signals 208 as output signals 307 via the multiplexer 204 based on the identity of the heterogeneous DIMM. At block 403, the I/O transceivers (206 of FIG. 2 and 305a-h, 306, and/or 313 of FIGS. 3A-B) are trained by the training logic unit 205. Once a training sequence of the training logic unit 205 completes, at block 404 the heterogeneous DIMM 102 operates in a normal fashion i.e., data is transferred as needed to and from the heterogeneous DIMM.

FIG. 4B illustrates a flow chart 410 for determining an identification of a heterogeneous DIMM 102 for interfacing the memory controller 101 with the heterogeneous DIMM 102, according to one embodiment of the invention. At block 401a the SPD identification from the heterogeneous DIMM is read by the logic unit 202 of the memory controller 101. In this flow chart, two embodiments of heterogeneous DIMM 101 are considered—DM-DIMM and ECC-DIMM. Other types of DIMMs can be used with the memory controller 101 without changing the essence of the embodiments of the invention. If the memory controller 101 determines that the SPD identification 106 read at block 401a is for a DM-DIMM, then block 411 is followed which starts the method at block 402 of FIG. 4A and FIG. 4C.

If the memory controller 101 determines that the SPD identification 106 read at block 412 is for an ECC-DIMM, then at block 412 a subset of data lanes/buses for ECC purposes (310) is assigned to the ECC DRAM unit 323 of the ECC-DIMM as discussed with reference to FIGS. 3A-B. At block 413, the method continues from block 403 of FIG. 4A.

FIG. 4C illustrates a flow chart 402 for mapping a heterogeneous DIMM 102 to the memory controller 101, according to one embodiment of the invention. After the multiplexer 204 assigns signals from among the output signals 307 to different I/O transceivers based on the SPD identification 106 of the heterogeneous DIMM 102, at block 402a, a data strobe signal (a DQS signal in FIG. 3C) is aligned with associated signals on data lanes (DQ signals 309a-h, 331a-h, and 331a-h of FIG. 3A-B) by positioning the data strobe signal to latch the associated signals of data lanes. One method for aligning the data strobe signal with associated signals on data lanes is described in U.S. Pat. No. 7,307,900.

At block 402b, if the heterogeneous DIMM is a DM-DIMM then a DM bit is assigned to a bit lane reserved for the subset of data lanes for ECC. As a result of this assignment, in one embodiment the DM bit signals are transmitted to the DM-DIMM via the subset of data lanes reserved for ECC. As discussed with reference to FIG. 3A, ECC signals 310 are mapped to DM bits signals 310a-h.

At block 402c, the DM bit signals 310a-h are aligned with corresponding data signals (for example, DQ signals in FIG. 3C) for the corresponding DRAMs 311a-h, wherein the data signals are aligned at block 402a with a corresponding data strobe signal (for example, DQS signals in FIG. 3C). In one embodiment, the DM bit signals 310a-h are delayed with respect to the data signals 309a-h associated with each of the DRAMs so that the DM bit signals 310a-h are aligned with respect to corresponding data signals 309a-h. In other embodiments, the data signals 309a-h and corresponding data strobe signals are delayed so that the DM bit signals 310a-h are aligned with respect to corresponding data signals 309a-h.

The term delay refers broadly to increasing and/or reducing delay in time of the signal. The term align refers broadly to position the data signals and the DM bit signal so that timing margin/requirements are met. In one embodiment, phase interpolators (not shown) are used to delay the data signals relative to the DM bit signals or vice versa.

Figure 5:
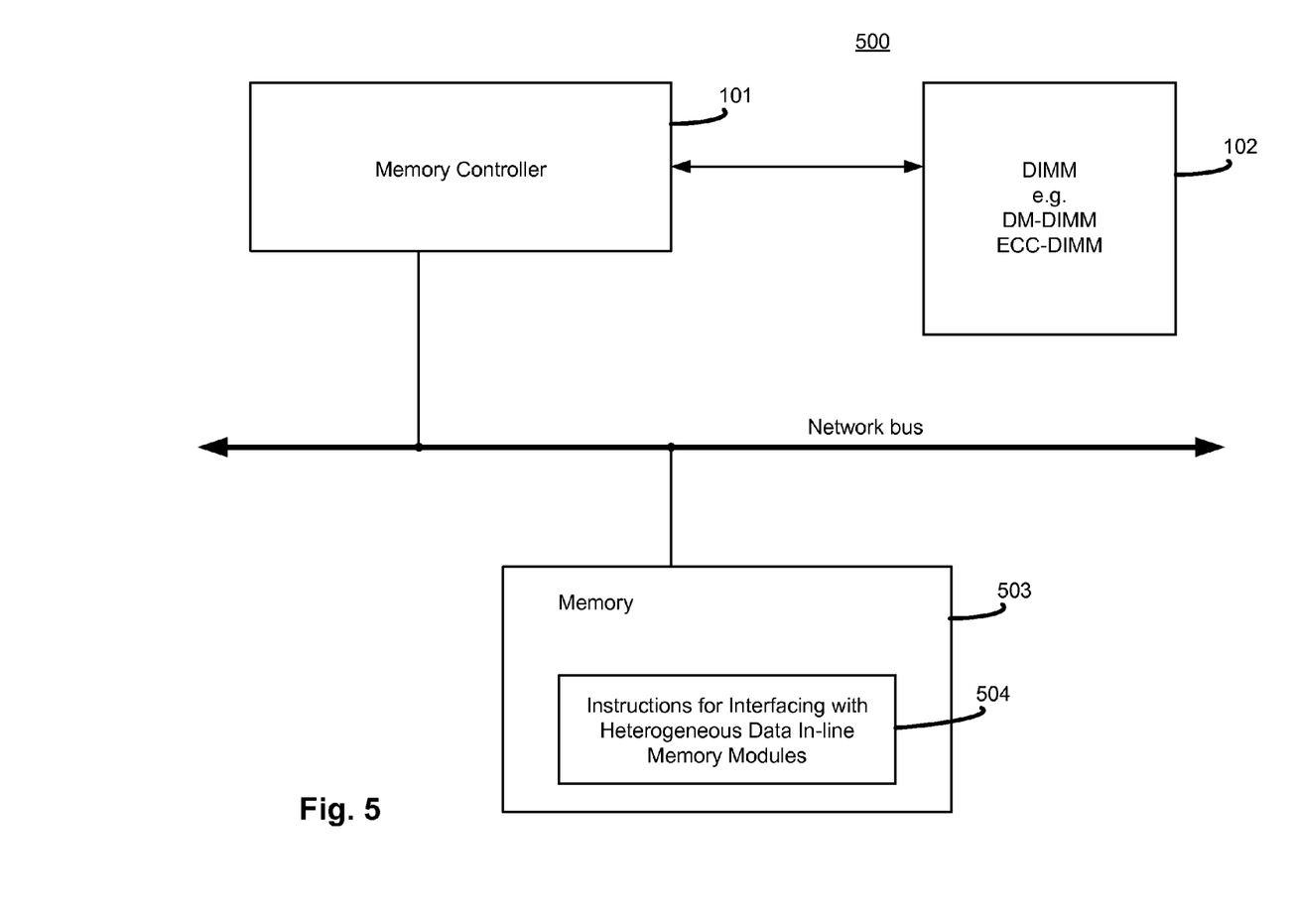
FIG. 5 illustrates a system with a machine-readable medium having computer executable instructions stored on the medium for interfacing the memory controller with a heterogeneous DIMM, according to one embodiment of the invention.

FIG. 5 illustrates a system 500 with a machine-readable medium 503 having computer executable instructions 504 stored on the medium 503 for interfacing the memory controller 101 with a heterogeneous DIMM 102, according to one embodiment of the invention. Referring back to FIGS. 1-4, in one embodiment the memory controller 101 is operable to map and align the signals from among the output signal 307 based on the computer executable instructions 504. For example, the logic unit 202 and the training logic unit 205 of FIG. 2 are programmable via the computer-executable instructions 504 to map and align the signals from among the output signal 307. The machine-readable storage medium 503 may include, but is not limited to, flash memory, optical disks, CD-ROMs, DVD ROMs, RAMs, EPROMs, EEPROMs, magnetic or optical cards, or other type of machine-readable storage media suitable for storing electronic or computer-executable instructions. For example, embodiments of the invention may be downloaded as a computer program which may be transferred from a remote computer (e.g., a server) to a requesting computer (e.g., a client) by way of data signals via a communication link (e.g., a modem or network connection).

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While the invention has been described in conjunction with specific embodiments thereof, many alternatives, modifications and variations of such embodiments will be apparent to those of ordinary skill in the art in light of the foregoing description. For example, in one embodiment the controller 101 is functionally integrated within a general purpose CPU and does not exist as a separate processor on the motherboard. The embodiments of the invention are intended to embrace all such alternatives, modifications, and variations as to fall within the broad scope of the appended claims.

We claim:

1. A method comprising:
    determining an identity of a dual in-line memory module (DIMM) having data lanes, wherein the identity of the DIMM indicates whether the DIMM is a data-mask (DM) DIMM (DM-DIMM) or an error correction code (ECC) DIMM (ECC-DIMM), wherein the:
    DM-DIMM includes an interface for a DM bit associated with the data lanes; and
    ECC-DIMM includes an interface for an ECC bit, wherein the interfaces of the DM-DIMM and the ECC-DIMM are different from one another;
    mapping the data lanes based on the determining of the identity of the DIMM;
    training input-output (I/O) transceivers in response to the mapping of the data lanes by:
        centering a strobe signal relative to signals on corresponding data lanes; and
        adjusting an eye width and height for each of the signals on the corresponding data lanes by adjusting a drive strength of the I/O transceivers; and
    transferring data to and from the DIMM after training the I/O transceivers.

2. The method of claim 1, wherein mapping the data lanes based on the determining of the identity of the DIMM comprises:
    multiplexing the data lanes by a controller coupled with the DIMM;
    assigning a DM bit from among the data lanes to each dynamic random access memories (DRAMs) of the DIMM if the identity of the DIMM is the DM-DIMM; and
    assigning a subset of the data lanes for ECC if the identity of the DIMM is the ECC-DIMM.

3. The method of claim 2, wherein assigning the DM bit comprises assigning the DM bit to a bit lane reserved for the subset of the data lanes for ECC.

4. The method of claim 2, wherein assigning the DM bit comprises:
    aligning a data strobe signal with associated signals of data lanes by positioning the data strobe signal to latch the associated signals of data lanes;
    assigning the DM bit to a bit lane reserved for the subset of the data lanes for ECC, the assigned DM bit to correspond to each of the DRAMs of the DM-DIMM; and
    aligning a DM bit signal of the assigned DM bit with the associated signals of data lanes by adjusting a delay of the DM bit signal with respect to a data signal from among the associated signals of data lanes.

5. The method of claim 2, wherein assigning the subset of the data lanes for ECC comprises assigning the subset of the data lanes to an ECC DRAM unit of the DIMM.

6. The method of claim 1, wherein the DIMM is a small-outline (SO) DIMM.

7. The method of claim 1, wherein determining the identity of the DIMM comprises reading a serial presence detect (SPD) identification from the DIMM.

8. An apparatus comprising:
input-output (I/O) transceivers operable to send and receive data to and from a dual in-line memory module (DIMM) via data lanes;
a logic unit operable to determine an identity of the DIMM, wherein the identity of the DIMM indicates whether the DIMM is a data-mask (DM) DIMM (DM-DIMM) or an error correction code (ECC) DIMM (ECC-DIMM), wherein the:
DM-DIMM includes an interface for a DM bit associated with the data lanes; and
ECC-DIMM includes an interface for an ECC bit, and wherein the interfaces of the DM-DIMM and the ECC-DIMM are different from one another; and
a multiplexer, coupled with the logic unit and with the I/O transceivers, operable to map the data lanes based on the identity of the DIMM.

9. The apparatus of claim 8, wherein the logic unit is operable to read a serial presence detect (SPD) identification from the DIMM to determine whether the DIMM is the DM-DIMM or the ECC-DIMM.

10. The apparatus of claim 8, wherein the multiplexer is operable to:
assign a DM bit from among the data lanes to each dynamic random access memories (DRAMs) of the DIMM if the DIMM is the DM-DIMM; and
assign a subset of the data lanes for ECC if the DIMM is the ECC-DIMM.

11. The apparatus of claim 10, wherein the multiplexer is operable to assign the DM bit to a bit lane reserved for the subset of the data lanes for ECC.

12. The apparatus of claim 10 further comprising a training unit operable to:
align a data strobe signal with associated signals of data lanes by positioning the data strobe signal to latch the associated signals of data lanes;
assign the DM bit to a bit lane reserved for the subset of the data lanes for ECC, the assigned DM bit to correspond to each of the DRAMs of the DM-DIMM; and
align a DM bit signal of the assigned DM bit with the associated signals of data lanes by adjusting a delay of the DM bit signal with respect to a data signal from among the associated signals of data lanes.

13. The apparatus of claim 10, wherein the multiplexer is operable to assign the subset of the data lanes for ECC by assigning the subset of the data lanes to an ECC DRAM unit of the ECC-DIMM.

14. The apparatus of claim 8 further comprises a training logic unit operable to:
train the I/O transceivers by centering a strobe signal relative to signals on corresponding data lanes; and
adjust an eye width and height for each of the signals on the corresponding data lanes by adjusting a drive strength of the I/O transceivers.

15. The apparatus of claim 8, wherein the DIMM is a small-outline (SO) DIMM.

16. A system comprising:
a dual in-line memory module (DIMM); and
a controller coupled with the DIMM via data lanes, the controller further comprising:
input-output (I/O) transceivers operable to send and receive data to and from the DIMM via data lanes;
a logic unit operable to determine an identity of the DIMM, wherein the identity of the DIMM indicates whether the DIMM is a data-mask (DM) DIMM (DM-DIMM) or an error correction code (ECC) DIMM (ECC-DIMM), wherein the:
DM-DIMM includes an interface for a DM bit associated with the data lanes; and
ECC-DIMM includes an interface for an ECC bit, and wherein the interfaces of the DM-DIMM and the ECC-DIMM are different from one another; and
a multiplexer, coupled with the logic unit and with the I/O transceivers, operable to map the data lanes based on the identity of the DIMM.

17. The system of claim 16, wherein the controller is operable to interface with either the DM-DIMM or the ECC-DIMM.

18. The system of claim 16, wherein the multiplexer is operable to:
assign a DM bit from among the data lanes to each dynamic random access memories (DRAMs) of the DIMM if the DIMM is the DM-DIMM; and
assign a subset of the data lanes for ECC if the DIMM is the ECC-DIMM.

19. The system of claim 18, wherein the multiplexer is operable to assign the DM bit to a bit lane reserved for the subset of the data lanes for ECC.

20. The system of claim 18 further comprising a training unit operable to:
align a data strobe signal with associated signals of data lanes by positioning the data strobe signal to latch the associated signals of data lanes;
assign the DM bit to a bit lane reserved for the subset of the data lanes for ECC, the assigned DM bit to correspond to each of the DRAMs of the DM-DIMM; and
align a DM bit signal of the assigned DM bit with the associated signals of data lanes by adjusting a delay of the DM bit signal with respect to a data signal from among the associated signals of data lanes.

21. The system of claim 18, wherein the multiplexer is operable to assign the subset of the data lanes for ECC by assigning the subset of the data lanes to an ECC DRAM unit of the ECC-DIMM.

22. The system of claim 16 further comprising a training logic operable to:
train the I/O transceivers by centering a strobe signal relative to signals on corresponding data lanes; and
adjust an eye width and height for each of the signals on the corresponding data lanes by adjusting a drive strength of the I/O transceivers.

23. The system of claim 22, wherein the training logic unit 205 is operable to adjust the delays of signals on each of the data lanes to cause the signals to have equal flight times.

24. The system of claim 16, wherein the DIMM is a small-outline (SO) DIMM.

* * * * *